United States Patent [19]

Pala

[11] Patent Number: 5,192,345
[45] Date of Patent: Mar. 9, 1993

[54] SYSTEM AND PROCESS FOR THE PURIFICATION TREATMENT OF SMOKES, DUSTS AND EXHAUST GASES AFTER COMBUSTION

[76] Inventor: Luca Pala, via Capo delle armi, 54, 00122 Ostia Lido, Rome, Italy

[21] Appl. No.: 730,917
[22] PCT Filed: Mar. 29, 1990
[86] PCT No.: PCT/IT90/00034
§ 371 Date: Jul. 30, 1991
§ 102(e) Date: Jul. 30, 1991
[87] PCT Pub. No.: WO91/09663
PCT Pub. Date: Jul. 11, 1991

[30] Foreign Application Priority Data
Dec. 22, 1989 [IT] Italy .................. 48690 A/89

[51] Int. Cl.⁵ .............................. B01D 47/12
[52] U.S. Cl. .......................... 55/223; 55/89; 55/94; 55/228; 55/238; 55/259; 55/DIG. 30
[58] Field of Search .............. 55/89, 94, 223, 228, 55/229, 237, 258, 259, DIG. 30

[56] References Cited

U.S. PATENT DOCUMENTS

| | | | |
|---|---|---|---|
| 3,475,881 | 11/1969 | Arnold et al. | 55/94 |
| 3,487,620 | 1/1970 | Klein et al. | 55/223 X |
| 3,495,385 | 2/1970 | Glass | |
| 3,582,051 | 6/1971 | Klein | 55/223 X |
| 3,668,839 | 6/1972 | Misarek | |
| 3,742,682 | 7/1973 | Ligutom | |
| 3,800,513 | 4/1974 | Lappin et al. | 55/238 |
| 3,841,063 | 10/1974 | Absher | |
| 4,353,845 | 10/1982 | Chartrand et al. | 55/228 X |

FOREIGN PATENT DOCUMENTS 1183384 7/1959 France.
1224072 3/1971 United Kingdom.

Primary Examiner—Charles Hart
Attorney, Agent, or Firm—Beveridge, DeGrandi, Weilacher & Young

[57] ABSTRACT

The system according to the present invention comprises a hood or a cone provided above smokestacks, industrial chimneys, flues and nearby exhaust-pipes, for leading smokes, dusts and gases, by means of a suction fan, into a serpentine duct provided with a series of nozzles for the nebulization of water under pressure coming from a pump or a compressor, and that will reduce pollution firstly into smog and then into sewage, while the purified air and/or vapor get out through a filter-grate.

10 Claims, 2 Drawing Sheets

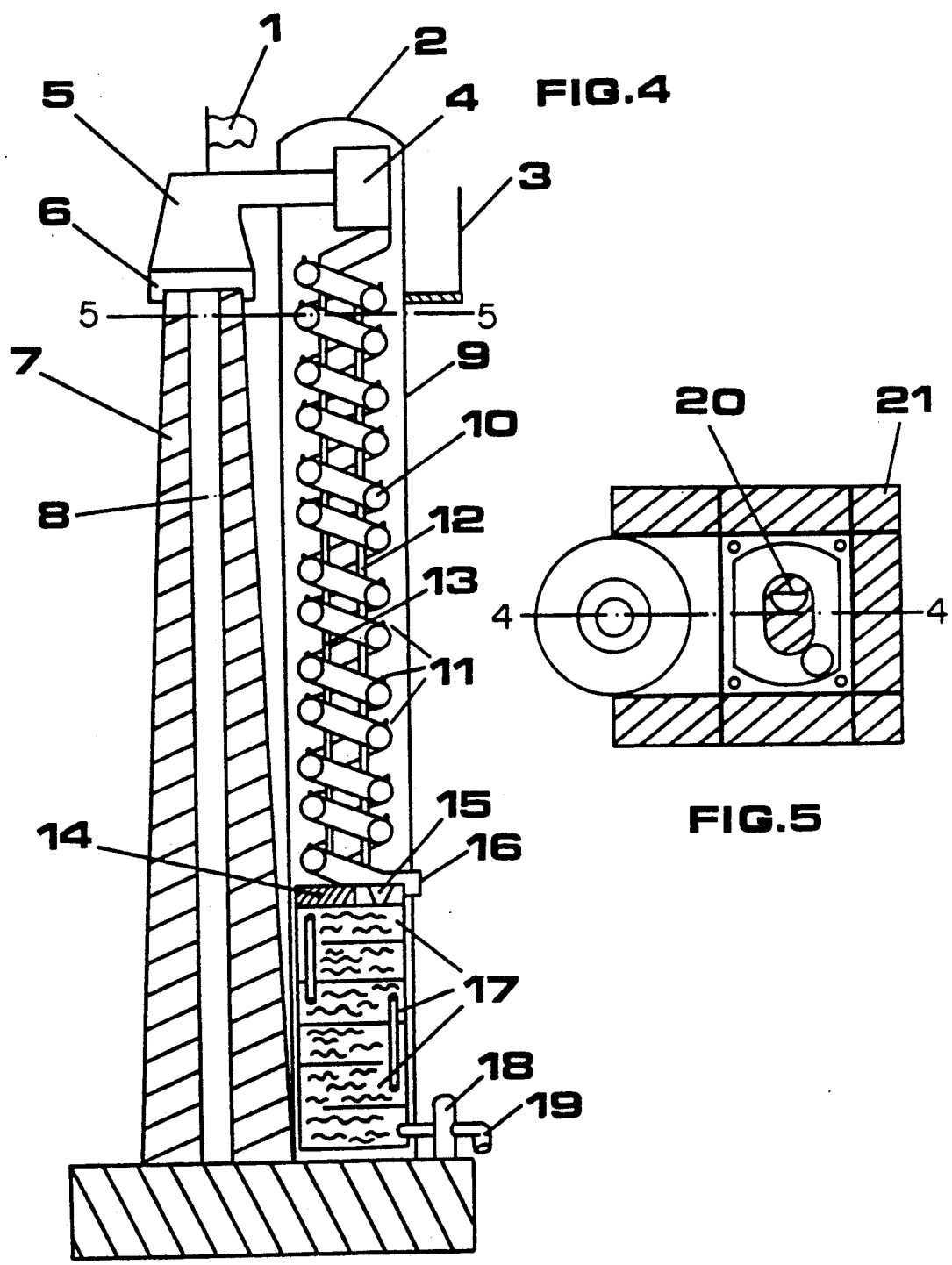

SYSTEM AND PROCESS FOR THE PURIFICATION TREATMENT OF SMOKES, DUSTS AND EXHAUST GASES AFTER COMBUSTION

The present invention concerns a system for realizing a process for the purification treatment of smokes, dusts and exhaust gases after combustion, consisting of suction means and water-nebulizing nozzles, for the transformation of said smokes, dusts and gases firstly into smog and then into sewage.

The object of the present invention may be applied to all devices characterized in the emission of smokes, dusts and exhaust gases like: smokestacks, flues of heating systems, industrial exhaust chimneys and the exhaust-pipes for combustion gases of endothermic motor vehicles.

The problem of air pollution, with the following stagnation of the smog and the falling down of acid rains, actually shows an increase proportional to industrialization, and the essays of elimination of the polluting elements are not sufficient for the protection of healt of people and nature.

It is the aim of the present invention to reduce above said damages for the health and for nature by the treatment and the purification of smokes, dusts and exhaust gases before these are led into the atmosphere, by the reduction of the polluting agents into sewage, that in turn may be treated in a well-known manner.

The aim set forth may be reached according to the present invention by means of a system comprising a hood or a cone, provided above the smokestacks, the industrial chimneys, the flues and nearby the exhaust-pipes, for leading smokes, dusts and gases, by means of a suction fan, into a serpentine duct provided with a series of nozzles for the nebulization of water under pressure coming from a pump or a comperssor, that will reduce the pollution firstly into smog and then into sewage, while the purified air and/or vapour get out through a filter-grate.

Said sewage will be led, by means of an appropriate conveyor and duct, into decantation basins, and filtered for being re-used or discharged into the drains.

The object of the present invention will be described more in detail hereinbelow according to the enclosed drawings, in which two preferred embodiments are shown.

FIGS. 4 and 5 show a vertical section and a section along A—A of the system for the realization of the purification process of smokes coming out of smokestacks, industrial chimneys and flues for domestic heating systems, placed inside a metal tower.

Figure 1:
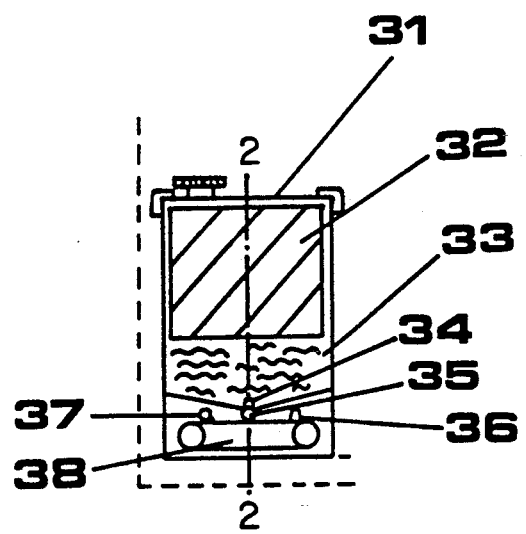
FIGS. 1-3 show vertical sections A—A and B—B and the horizontal section C—C, respectively of a variant of the system for the treatment of the exhaust gases of combustion vehicles, placed in a container provided in the luggage van of the vehicles, and that will aspire the exhaust gases and emit purified air or vapor.

The system for the realization of the purification process according to FIGS. 4-5 comprises the following means:
a wind vane 1
a cover 2 of the system
a protection and maintenance plane 3
a suction fan 4 (variable)
a cap 5 for the collection of the smokes
a movable screen 6 for the protection from the wind
a structure 7 (smokestack)
a duct 8 for the smoke
a metal structure 9 for the support of the system
a plurality of tubes 10 for the treatment of the smokes
a plurality of nozzles or nebulizer injectors 11
an air duct 12 for performing the nebulization
a duct 13 for the water to be nebulized
an air compressor 14
a sewage conveyor 15
an outlet 16 for purified air or vapor
a plurality of basins 17 for the decantation of the sewage
a ladder 20 for allowing the access to the system
a floor-grate 21 for maintenance.

Figure 2:
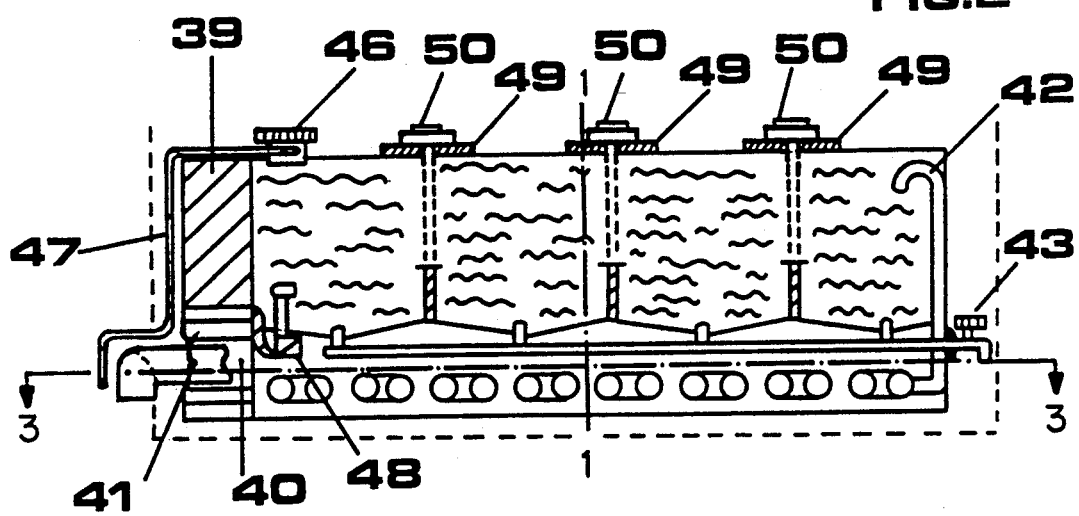
Figure 3:
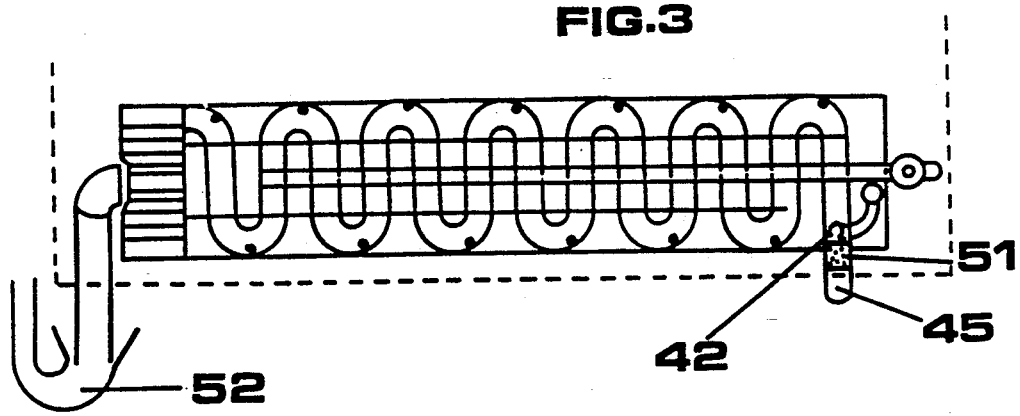

For what concerns the variant of the system for the treatment of the exhaust gases of combustion-motor vehicles, as shown in FIGS. 1-3, the following means are comprised:
a replaceable filter 31,
a water-tank 32,
a tank 33 for the storage of the sewage,
an outlet 34 for the discharge of the sewage,
a tube 35 for the discharge of the sewage,
a duct 36 with nozzles for the emission of air from the compressor,
a duct 37 for bringing the water to the nebulizing nozzles,
a serpentine duct 38 for the smoke treatment area,
a compressor 39 for providing the pressure to the nebulizers,
an aspiration fan 40 at variable speed,
a tube 41 for connecting the exhaust-pipe to the purification system
a tube 42 for the re-cycling of the water,
a tap 43 for the discharge of the sewage,
a sewage conveyor 44,
a tube 45 for the outlet of purified air or vapour,
a plug 46 for the loading of the tank, with bleed 47,
an electrovalve 48 for stopping the water flow to the nebulizers,
a gasket 49 for the plug of the filters,
a device 50 for blocking the filters,
a filter 51 with metal rings in oil bath, provided at the the outlet,
a structure 52 for the protection of the connection between the exhaust-pipe and the cone of the system.

In said latter variant of the system according to the present invention the energy for the working of the fan 40 and of the compressor will be obtained from the accumulator battery or from the current generator of the vehicle, by means of the passage through the accelerator.

The advantages obtained by means of the purification system and process according to the present invention, are the following:
reduction of the air pollution;
lowering of elimination of the smog-effect, that in determined periods stagnates above urban centers, causing problems to the health of people;
reduction or elimination of the causes of deterioration of monuments in urban centres.

I claim:

1. A system for purifying pollutants contained in post combustion gases travelling out of an exhaust conduit, comprising:
a cap, said cap being positioned so as to direct the post combustion gases into said system;

a suction fan for drawing the post combustion gases through said cap and further into said system;

a serpentine treatment tube having an upstream end and a downstream end, the upstream end of said serpentine treatment tube being in communication with the post combustion gases exiting said cap;

nozzles spaced along said treatment tube between the first and second ends of said treatment tube;

means for introducing water and air to said treatment tube such that water is nebulized by said nozzles and pollutants are separated from the post combustion gases and combined with the water so as to form sewage and such that sewage flow from the upstream end of said treatment tube to the downstream end is facilitated; and means for storing the sewage and separating the water and the pollutants contained in the sewage, said means for storing and separating being in fluid communication with the downstream end of said treatment tube out through which the purified exhaust gases exit, and wherein the exhaust conduit is an automobile exhaust conduit and said cap includes an inlet tube that is dimensioned and arranged so as to direct automobile exhaust into said system, and wherein said means for storing and separating includes a recycling water conduit and a first water storage tank, said recycling water conduit extending from the downstream end of said treatment tube and opening into said first water storage tank, and said system further comprising a sewage line, a filter and an additional water storage tank in fluid communication with said first water storage tank through said filter, said water storage tanks each including a sloped bottom and a discharge tube extending from the sloped bottom and in communication with said sewage line positioned below said water storage tanks.

2. A system for the treatment of exhaust gases of a combustion motor vehicle, comprising:

a first water-storage tank having a lower storage area for sewage and a sewage outlet conduit in communication with the lower storage area;

a serpentine treatment tube having an upstream end in line with an exhaust conduit of the automobile;

nozzles spaced along said treatment tube between the upstream end and downstream end;

means for introducing water and air to said treatment tube such that water is nebulized by said nozzles, said means for introducing including a water conduit in fluid communication with said water storage tank;

a water recycling tube in fluid communication with the downstream end of said treatment tube and with said water storage tank; and a sewage conveyor line in fluid communication with the sewage outlet conduit of said water storage tank.

3. A system as recited in claim 2, further comprising an inlet tube and a suction fan positioned between said inlet tube and said treatment tube.

4. A system as recited in claim 3, further comprising a filter and second water storage tank in fluid communication with said first water storage tank through said filter.

5. A system as recited in claim 2, wherein said treatment tube is planar and positioned below said water storage tank.

6. A system for purifying pollutants contained in post combustion gases travelling out of an exhaust conduit, comprising:

a cap, said cap being positioned so as to direct the post combustion gases into said system;

a suction fan for drawing the post combustion gases through said cap and further into said system;

a serpentine treatment tube having an upstream end and a downstream end, the upstream end of said serpentine treatment tube being in communication with the post combustion gases exiting said cap;

nozzles spaced along said treatment tube between the first and second ends of said treatment tube;

means for introducing water and air to said treatment tube such that water is nebulized by said nozzles and pollutants are separated from the post combustion gases and combined with the water so as to form sewage and such that sewage flow from the upstream end of said treatment tube to the downstream end is facilitated; and means for storing the sewage and separating the water and the pollutants contained in the sewage, said means for storing and separating being in fluid communication with the downstream end of said treatment tube out through which the purified exhaust gases exit, and wherein the exhaust conduit is an automobile exhaust conduit and said cap includes an inlet tube that is dimensioned and arranged so as to direct automobile exhaust into said system, and wherein said means for storing and separating includes a recycling water conduit and a first water storage tank, said recycling water conduit extending from the downstream end of said treatment tube and opening into said first water storage tank, and said system further comprising an oil filter positioned at the downstream end of said treatment tube between an exit opening in said treatment tube and said recycling water conduit.

7. A system for purifying smoke coming out of a smokestack, comprising:

a metal tower positioned adjacent the smokestack;

a cap for the collection of smoke exiting the smokestack;

a cover for the system, said cover forming one end of said tower;

a protection and maintenance plane supported by said tower;

a sunction fan for drawing smoke from the cap to the tower;

a movable screen positioned between said cap and an open end of said smokestack;

a serpentine treatment tube into which the smoke enters after exiting said cap;

a metallic structure for supporting the treatment tube extending within said tower;

a plurality of nozzles or nebulizer injectors supported by said treatment tube;

an air duct for performing the nebulization, said air duct being positioned within said tower adjacent said treatment tube;

a water duct for supplying the water to said nozzles, said water duct being positioned within said tower adjacent said treatment tube;

an air compressor for providing said air duct with compressed air;

a sewage conveyor which is positioned to receive a mixture of water and impurities in said smoke which exits said treatment tube;

an outlet which is provided for exhausting treated smoke that has passed through said treatment tube;

a plurality of basins for the decantation of the sewage exiting said sewage conveyor;

a ladder supported by said tower for facilitating access to said system;

a floor grate positioned at the base of said tower.

8. A system as recited in claim 7 further comprising a wind vane supported by said cap.

9. A system as recited in claim 7, wherein said sunction fan is positioned in line between said cap and the upstream end of said treatment tube.

10. A system as recited in claim 7, wherein a plurality of said nozzles are nebulizer injectors.

* * * * *